United States Patent [19]

Kelbel et al.

[11] Patent Number: 5,705,818
[45] Date of Patent: Jan. 6, 1998

[54] METHOD AND APPARATUS FOR DETECTING RADIOACTIVE CONTAMINATION IN STEEL SCRAP

[75] Inventors: Clinton J. Kelbel; Floyd A. Johnston, both of Baltimore, Md.

[73] Assignee: Bethlehem Steel Corporation, Del.

[21] Appl. No.: 609,043

[22] Filed: Feb. 29, 1996

[51] Int. Cl.[6] .................................. G01T 1/20
[52] U.S. Cl. ........................ 250/361 R; 250/362
[58] Field of Search .................. 250/361 R, 362

[56] References Cited

U.S. PATENT DOCUMENTS

| | | | |
|---|---|---|---|
| 2,717,693 | 9/1955 | Holmes | 209/72 |
| 2,954,462 | 9/1960 | Utt et al. | 340/933 |
| 3,142,816 | 7/1964 | Weizenbaum | 340/933 |
| 3,324,301 | 6/1967 | Goldberg | 246/29 R |
| 3,659,261 | 4/1972 | Tonies | 340/23 |
| 3,691,368 | 9/1972 | Hoyler | 246/29 R |
| 3,731,067 | 5/1973 | Arevian et al. | 235/92 FQ |
| 4,288,689 | 9/1981 | Lemelson et al. | 235/435 |
| 4,360,733 | 11/1982 | Novak et al. | 250/361 R |
| 4,383,175 | 5/1983 | Toepke | 250/368 |
| 4,532,511 | 7/1985 | Lemelson | 340/933 |
| 4,880,981 | 11/1989 | Johnston | 250/369 |
| 4,912,471 | 3/1990 | Tyburski et al. | 342/42 |
| 5,008,539 | 4/1991 | Kirby | 250/336.1 |
| 5,019,815 | 5/1991 | Lemelson et al. | 340/933 |
| 5,330,142 | 7/1994 | Gnau, III | 248/122 |
| 5,417,388 | 5/1995 | Stillwell | 246/122 R |

OTHER PUBLICATIONS

DTS System, SmartPass, pp. 1–5.
G. Farnum, Will RFID Put the "Auto" into Auto ID?, Managing Automation, Oct. 1994, pp. 51–52.
T. Kuster, Danger: Radioactive Scrap, New Steel Oct. 1994, pp. 30–34.
R. Walker, Detection of Radiation in Scrap Feedstock and Products in Canadian Steel Mills, Iron & Steel Engineer, Apr. 1988, pp. 39–44.
J. Bellian, Radioactive Material in Scrap Metal, Harshaw/Bicron Radiation Measurement Products, pp. 1–19.

Primary Examiner—David P. Porta
Assistant Examiner—Richard Hanig

[57] ABSTRACT

A method of monitoring for radioactive contamination of scrap contained in a railroad car comprises the steps of detecting the presence of a moving railroad car. The railroad car is scanned for radioactive contamination upon being detected, and scanning continues thereafter. The identification of the railroad car is then determined by an RFID system. The scintillator scanning for radiation is deactivated when the vehicle is no longer detected. Once scanning is completed, then a determination is made whether the scanned vehicle is contaminated with radiation, and an indication that the vehicle is contaminated is made in that event.

12 Claims, 4 Drawing Sheets

METHOD AND APPARATUS FOR DETECTING RADIOACTIVE CONTAMINATION IN STEEL SCRAP

FIELD OF THE INVENTION

The disclosed invention is to a method and apparatus for detecting radioactive contamination of steel scrap prior to use thereof in a steelmaking furnace. More particularly, the invention is to a method and apparatus for scanning a moving railroad car containing steel scrap for the presence of radioactive contamination, with the ability to identify the contaminated car and to actuate an alarm in the event contamination is detected.

BACKGROUND OF THE INVENTION

Many steelmaking facilities, utilize scrap steel as part of the steelmaking process. The scrap steel frequently will be purchased or acquired from one or more scrap vendors, the location of each of which is remote from the steel plant. The scrap vendors typically acquire the scrap from any number of sources, such as from automobile scrap yards, demolition projects, waste haulers, and the like, with the result that various grades and types of scrap steel may be included in a shipment to a steel plant. Some scrap vendors sort the scrap, while others do not.

Steel scrap, by its nature, it not only heavy, but bulky. It is typical for the scrap vendor to have the purchased scrap transported to the steel plant purchaser in a railroad car. Typically, a number of scrap-containing gondola cars will be hooked together in a train, either by the scrap vendor or at a marshalling yard. It is likely that a train containing steel scrap will include scrap from any number of sources, of varying grades, and also be both sorted and unsorted, depending upon scrap vendor.

Because steel scrap vendors acquire the material from any number of sources, then it is not unusual for the scrap to contain materials other than steel. While some scrap vendors attempt to remove contaminants from the steel scrap, others do not and/or contaminants escape detection. The steel plant itself typically will have a procedure to attempt to remove contaminants, but some contaminants likely will remain undetected.

The manufacture of steel from steel scrap causes the scrap to be melted in the steelmaking furnace. Furnace temperatures frequently approach 3000° F., with the result that many of the contaminants likewise are melted. Should the contaminant be a radioactive source, such as found in an X-ray tube discarded by a medical establishment, for example, then melting of the shield material of the tube will cause radioactivity to be released. The steelmaking furnace normally will have a baghouse to control air pollution, with the result that melting of the X-ray tube will cause the radiation to be released and to ultimately contaminate the baghouse. Radioactive contamination of the baghouse and/or related facilities not only will be expensive to clean, but may actually be impossible to accomplish. The result may be a need to permanently close the steelmaking furnace and its related assemblies. There have already been a number of incidents in steelmaking plants where radioactive contamination has occurred as a result of scrap being melted.

Attempts have been made to monitor for radioactive scrap supplied to steel plants, whether by railroad train or truck. Monitoring trucks is feasible, because each truck may stop at a scanning station, thus permitting the particular truck to be identified should contamination be detected. Railroad trains, on the other hand, are not feasible to stop on a car-by-car basis, and a moving train cannot be instantaneously stopped should a particular car be determined to contain contaminated scrap. In the past, therefore, detection of contamination has required the entire train to be shunted aside, so that later the train may be moved on a car-by-car basis through a detector. Such a procedure is time consuming and expensive. Additionally, because of the possibility of a false alarm, such a procedure may be ignored by operating personnel and/or the alarm may be deactivated.

A problem with prior scanning techniques, both for railroad cars and trucks, has been a need for an attendant to operate the facility and/or to identify contaminated transport vehicles. Steel plants operate on an around-the-clock basis, and scrap may be received at any time on any day. It is expensive to station an attendant on an around-the-clock basis, particularly where there may be long stretches of time during which the detection facility may not be in operation because scrap is not being received.

Those skilled in the art will understand that there is a need for a radioactive contamination detection system capable of scanning for radioactive contamination, identifying the transport vehicle containing the contamination, and available for around-the-clock use without necessitating the presence of an attendant. The disclosed invention meets these needs and others by providing a scanner system suitable for detecting radioactive contamination and an active car identifier system, so that a railroad car, moving truck, or similar transport vehicle containing radioactive contamination may be identified with particularity and an alarm actuated identifying the vehicle.

SUMMARY OF THE INVENTION

A method for monitoring for radioactive contamination of transport vehicles comprises a series of steps including detecting the presence of a moving transport vehicle. The vehicle is scanned for radiation contamination upon its presence being detected, and the scan continues for so long as the vehicle is detected. The identity of the vehicle is determined while scanning occurs. Scanning ceases when the vehicle is no longer detected. A determination is made whether the scanned vehicle contains radioactive contamination after the scan is completed, and the identity of the vehicle is made known in that event and an alarm actuated.

A method of detecting radioactive contamination in scrap steel comprises the steps of providing a moving railroad car in which scrap material is contained. The scrap material is scanned for radiation contamination by moving the railroad car beyond a radiation scanner. The identity of the railroad car is determined while it is being scanned. Scanning is terminated after the railroad car has move beyond the radiation scanner. A determination is made after the scan is completed whether the railroad car contains contaminated scrap material and the identity of the railroad car containing the contaminated scrap material is then made known and an alarm actuated.

A system for detecting radioactive contamination of scrap contained in a transport vehicle comprises a first detector positioned proximate a roadway for detecting the presence of a moving vehicle. At least first and second laterally spaced scintillators are downstream of the first detector, with the scintillators being disposed on opposite sides of the roadway for therebetween defining a scan zone through which the vehicle passes. A second detector is positioned proximate the roadway downstream of the scintillators for detecting the presence of the moving vehicle. A vehicle identifier is proximate one of the scintillators, for identifying the vehicle detected by the detectors. A controller is operably associated with at least the first detector, the scintillators, and the identifier for activating the scintillators upon the first detector detecting a vehicle, for determining whether the vehicle contains radioactive contamination upon completion of a scan made by the scintillators, and for activating an indicator system should radioactive contamination be detected. A visual indicator is operably associated with the controller for identifying the vehicle having the contamination, and an audible indicator is operably associated with the controller for advising the vehicle operator of contamination.

These and other features of the invention will be readily apparent in view of the following description and drawings of the above-described invention.

BRIEF DESCRIPTION OF THE DRAWINGS

The above and other objects and advantages and novel features of the present will become apparent from the following detained description of the preferred embodiment of the invention illustrated in the accompanying drawings, wherein.

DETAILED DESCRIPTION OF THE INVENTION

Figure 1:
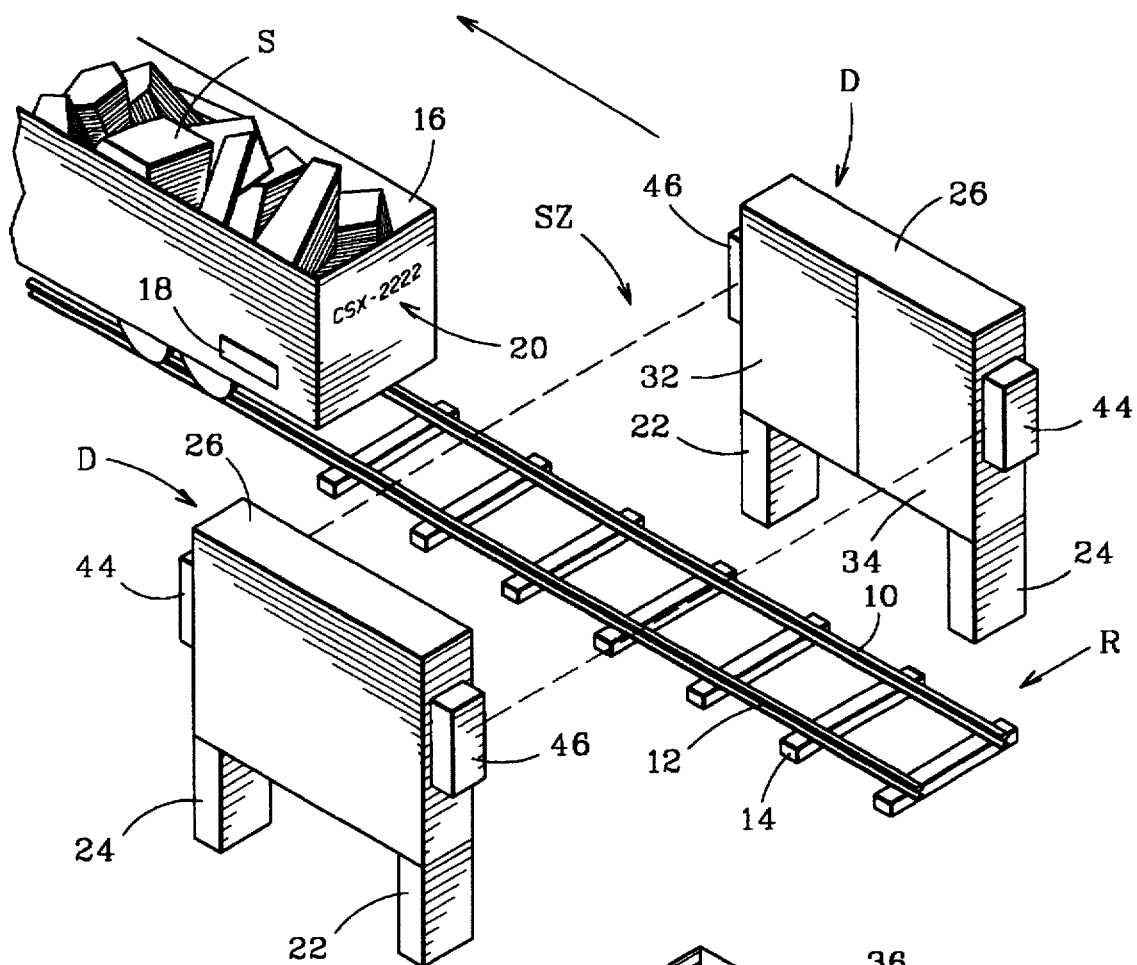
FIG. 1 is a fragmentary perspective view of a radiation contamination scanning station according to the invention.
Figure 1:
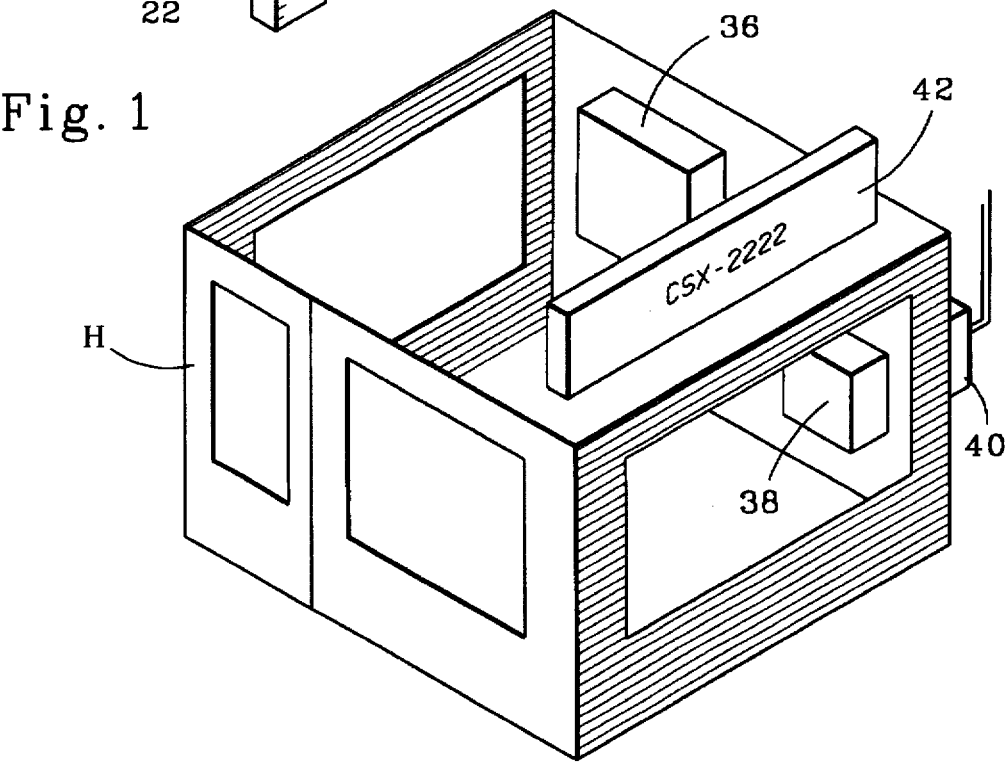
Figure 2:
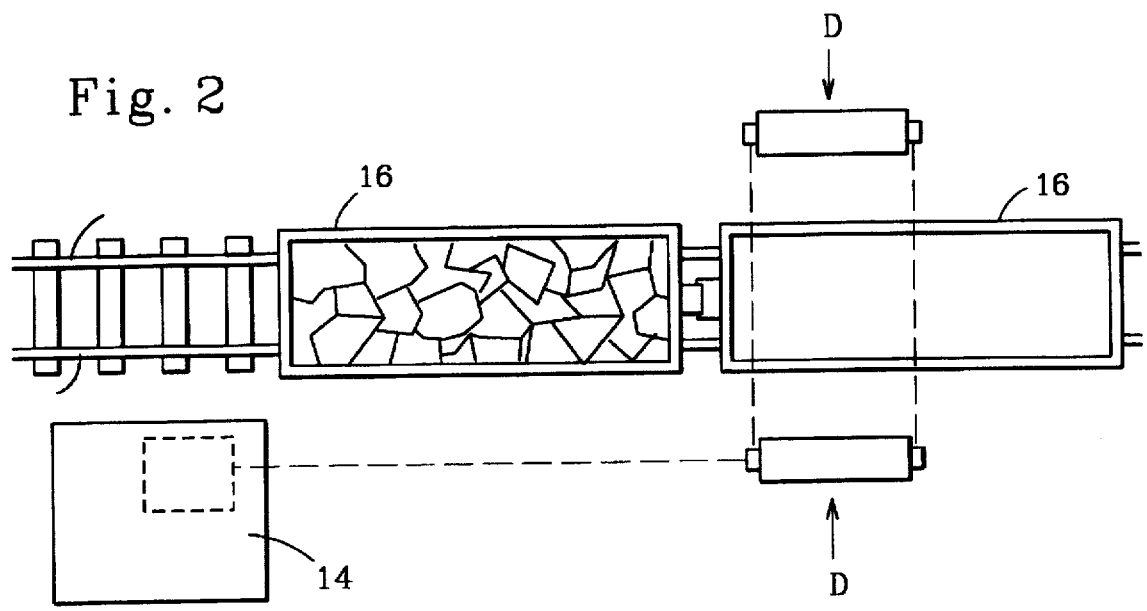
FIG. 2 is a fragmentary top plan view of the station of FIG. 1.
Figure 3:
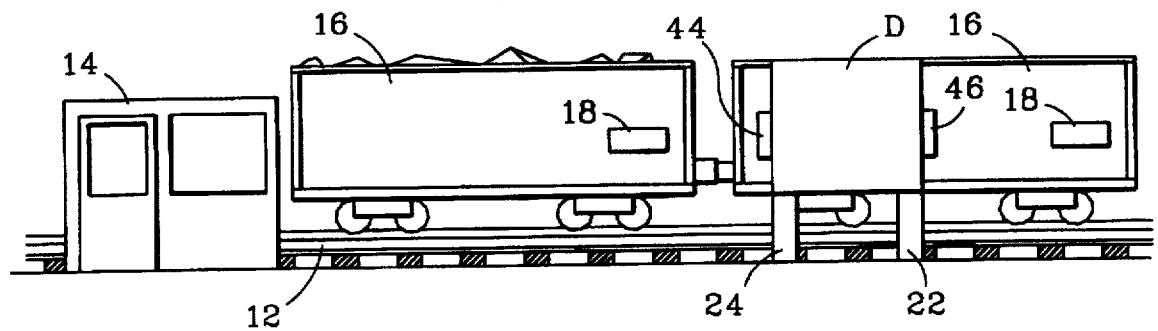
FIG. 3 is a side elevational view of the station of FIG. 2.
Figure 4:
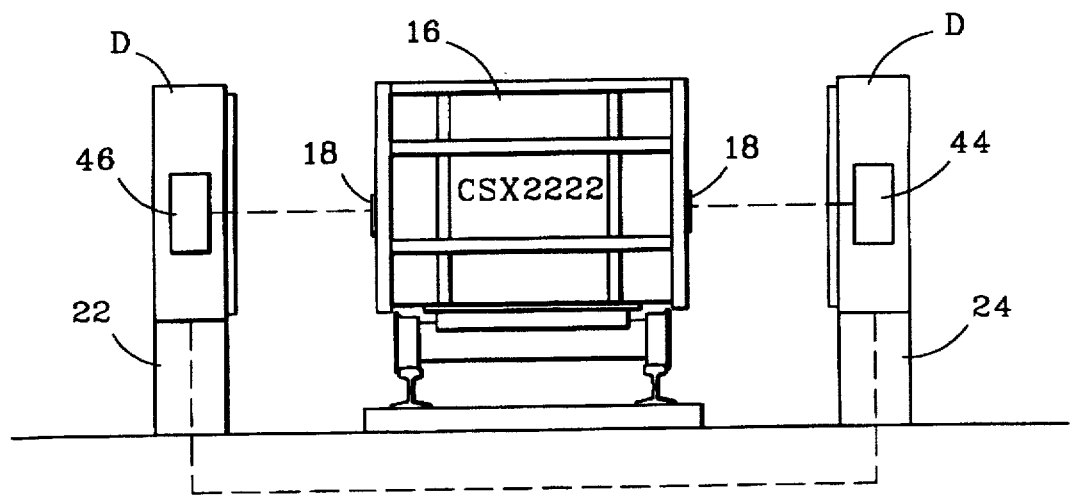
FIG. 4 is a front elevational view of the station of FIG. 2.

Roadway R, as best shown in FIG. 1, is defined by rails 10 and 12 extending along ties 14 on which railroad car 16 rides. Car 16 is traveling in the direction shown by the arrow. Car 16 preferably is a gondola car in which scrap S has been deposited. Scrap S preferably is steel scrap which has been deposited into car 16 at a site remote from a steel plant (not shown), and which is being transported to the steel plant for use in a steelmaking furnace. While we disclose the roadway R as being one used with railroad cars 16, those skilled in the art will understand that the invention may be used with other mobile transport vehicles, such as trucks. Also, we prefer that scrap scanning occur outside of the steel plant in order to minimize the likelihood of the scrap reaching the plant material processing section, and to preclude the plant from being responsible for disposal of contaminated scrap.

Car 16 has identification tags 18 on its front and rear lower side corners. Each tag 18 preferably is a radio frequency identification (RFID) tag which may be interrogated by a transceiver to receive information programmed into the tag, including an identification of the car. The car 16 typically will have an identification number 20 painted or otherwise applied to it, so the RFID tag 18 permits the identification to be determined electronically. The car 16 of FIG. 1 has the identification number CSX 2222. A typical RFID tag employs a transponder which therefore is attached to the car 16 to be identified. The tag 18 is programmed with information that may be read by a transceiver (radio transmitter and receiver), sometimes also called a reader or controller, when the tag 18 comes within the transceiver's range. Depending upon the system, the range may extend up to 100 meters. An exemplary RFID system may be purchased from ATS Systems of Kansas City, Mo. under the name SmartPass™.

Disposed on either side of roadway R are radiation detectors D, between which a scan zone SZ is defined. Each of the detectors D includes a scintillator, which preferably scans for gamma radiation. An exemplary detector is disclosed in U.S. Pat. No. 4,880,981, the disclosure of which is incorporated herein by reference. The detectors D preferably are the model ASM-6000 E as manufactured by Bicron Corporation.

Figure 5A:
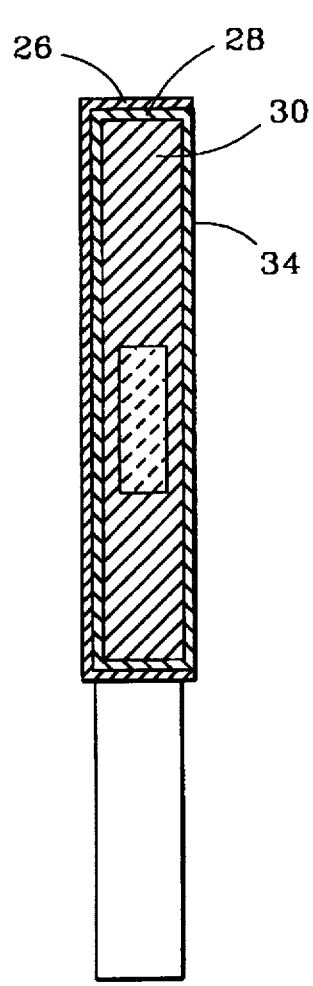
FIGS. 5a and b are cross-sectional views through a scintillator used with the invention.

Each of the detectors D, as best shown in FIGS. 5a and b, are mounted to vertical supports 22 and 24. A stainless steel housing 26 is secured to the supports, and the scintillator operating components are disposed within the housing 26. Each housing 26 preferably has a lead lining 28 extending along its rear, top, bottom, and sides, to provide a window oriented toward to the scan zone through which the car 16 is to pass. Because of the lead lining 28, then each of the plastic scintillator panels 30 receives radiation only through the window defined by the non-lead shielded portion of housing 26, thus minimizing spurious radiation impingement which could trigger false alarms. Preferably doors 32 and 34 are hingedly connected to the housing 26 to permit access to the panels 30, and the other operating components of the scintillators disposed within the housing 26. Because the panels 30 are operably impacted by gamma radiation, then the stainless steel doors 32 and 34 do not inhibit passage of the radiation therethrough.

Figure 5B:
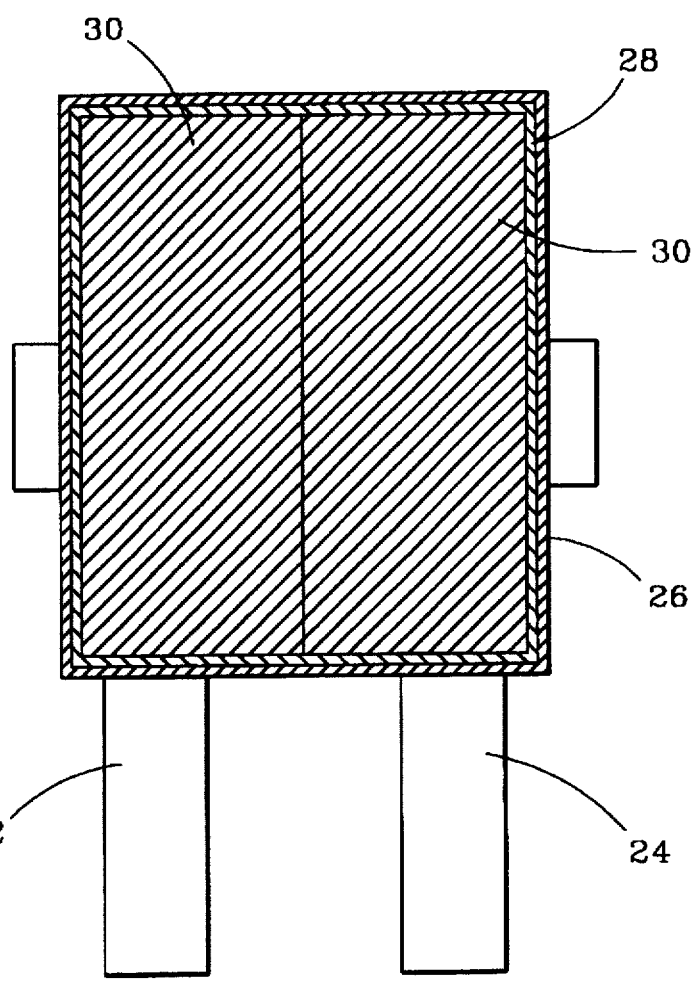

Preferably each of the detectors D consists of four 1500 cubic inch plastic scintillator panels 30 arranged two panels per detector D, as best shown in FIG. 5b. A microprocessor-based control unit is also provided, as explained herein later. The scintillator panels are excited by a photomultiplier tube powered by a high-voltage line driver circuit. The plastic of the panels is selected for receptivity to gamma-type radiation, which is anticipated to be the primary scrap contaminant. Because each detector D contains two plastic scintillator panels, then the scanning system comprised by the two detectors D is capable of scanning scan zone SZ even though as many as three of the four detector panels are out of service.

Housing H is proximate detectors D. Housing H contains the controller 36 operating each of the detectors D, and a controller 38 incorporating a transceiver which interrogates the tags 18. Controller 38 preferably also has a printer to output a hard copy record of each scan, or at least of each scan which detects radiation contamination. An antenna 40 is mounted to the exterior of housing H and is in operable communication with controller 38 for interrogating each tag 18, and for receiving responses therefrom. Mounted to the top of housing H is scoreboard 42 which is an alphanumeric display identifying the car 16 which is being scanned by the detectors D. Controller 36 in housing H is in operable connection with each of the detectors D, preferably through underground electrical lines.

Optical transmitters 44 are mounted to each of detectors D, and are each aligned with a corresponding receiver 46. The transmitters 44 and receivers 46 provide first and second through-beam scanners which detect the presence of a car 16 as it is moving along roadway R. The through-beam scanners are photoelectric sensors which provide a signal to controller 36 for causing the scintillators of the detectors D to be armed and thereby commence scanning when the railroad car 16 is detected, and for deactivating the scintillators when the railroad 16 is no longer present. The upstream through-beam scanner detects the car 16 as it is about to enter scan zone SZ, while the downstream scanner detects the car 16 as it is leaving the scan zone SZ.

Figure 6:
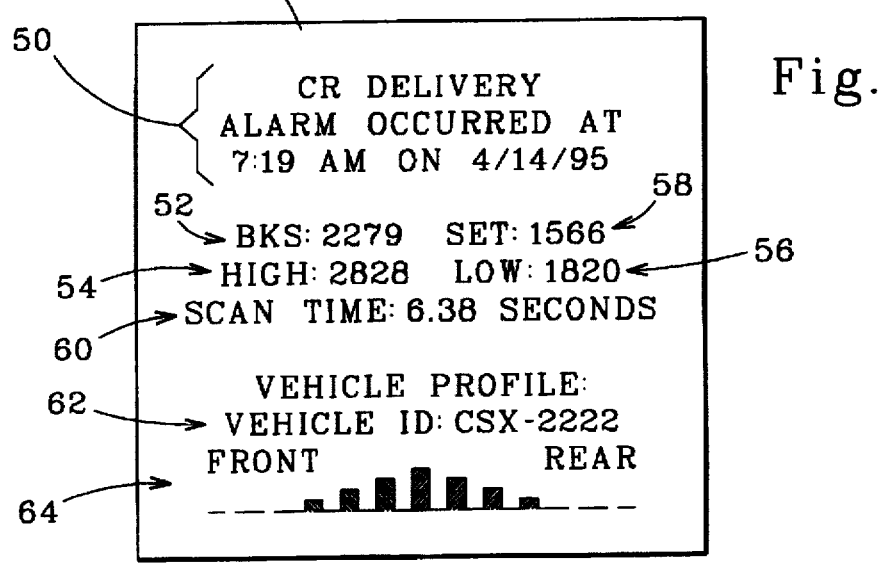
FIG. 6 is an illustration of the hard copy output of the invention.

FIG. 6 discloses hard record ticket 48 which is output by controller 38 in the event radioactive contamination of a car 16 is detected. The paper ticket 48 has a first portion 50 identifying the date and time at which the alarm was actuated by controller 36. The ticket 48 has a second portion providing information about the radiation levels detected, and the settings used for ascertaining contamination. Information is provided at 52 for the background radiation, the high reading detected by the detectors D is printed at 54, the low detected is printed at 56, and the set point at which the scintillators are armed is printed at 58. Printed at 60 is the scan time as determined by the through-beam scanners 44, 46 of the detectors D upon the car 16 passing through the scan zone SZ. At 62 is printed the identification of the car 16 of interest as determined from a tag 18. A profile of the scan is printed at 64 based upon the front and rear of car 16, so that personnel may be able to ascertain the potential site of contamination.

Those skilled in the art will understand that there is a natural background radiation level which is always present, and the detectors D and the software of the controller 36 need to take the background into consideration while scanning occurs. Radiation sources frequently are shielded, because they are in a closed container, so detection may be difficult where the source is in a scrap-containing vehicle which may cause the radiation to be collimated. In other words, the scrap disposed about a particular radiation source may have the effect of absorbing and/or redirecting the radiation.

The controller 36 to which each of the detectors D and their scintillator panels supply data must be able to handle the data while the railroad car 16 is passing beyond the detectors D. The controller 36 subtracts the natural background radiation while taking into consideration the effect of shielding created by the vehicle 16, and the speed of the vehicle. An alarm is actuated when radiation is detected. Controller 36 actuates each of the detectors D below natural background levels before the car 16 is actually in front of the detectors D, or else there will not be sufficient sensitivity to detect many shielded radioactive sources. The Bicron ASM-6000 E detectors D have suitable computer programming for use by controller 36 for performing the detection functions noted herein.

Figure 7:
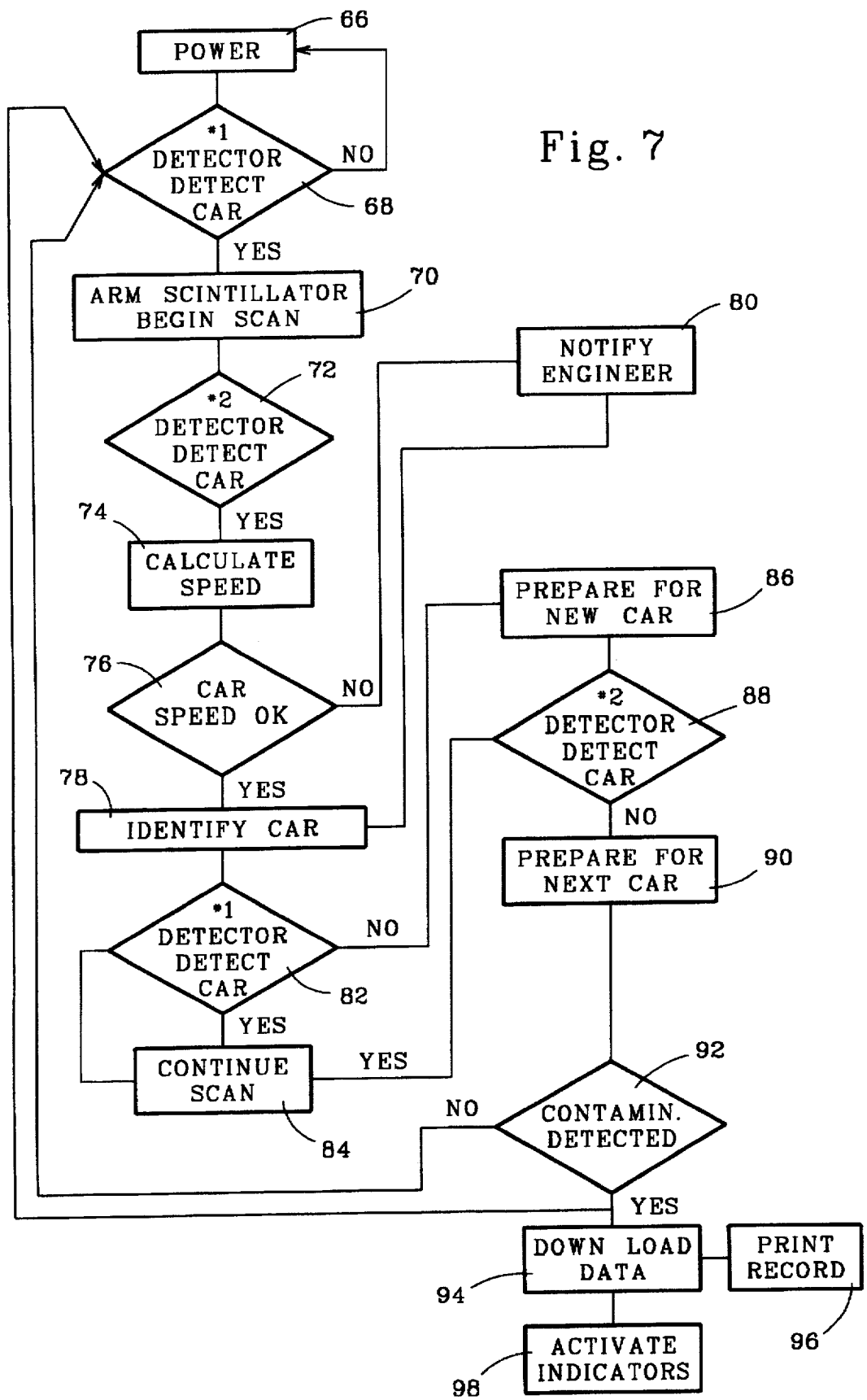
FIG. 7 is a flowchart illustrating operation of the station of FIG. 1.

Operation of the radiation detection system of the invention is illustrated in block diagram form in FIG. 7. As shown therein, power is supplied to controller 36 at 66, to operate the upstream and downstream through-beam scanners 44 and 46 on a continuous basis. Should the upstream through-beam scanner detect a railroad car 16 at 68, then the scintillator panels of the detectors D are armed at 70 by the controller 36. The detectors D each then begin to scan for radiation as the car 16 proceeds beyond them along roadway R. When the car is detected by the second or downstream through-beam scanner at 72, then the speed at which the car 16 is moving is calculated at 74. Speed may be calculated because the distance between the through-beam scanners is known, while transit time is measured. We prefer that the speed be kept at 5 miles per hour or less to provide a satisfactory scan. Should the car 16 be moving too quickly, then the detectors D may not be able to generate an accurate scan. Should it be determined at 76 that the car 16 is not exceeding the predetermined speed limit, then the identity of the car is determined at 78 through the controller 38, antenna 40, and tag 18. We prefer that the identity of the car 16 be ascertained upon entry into scan zone SZ, in order to minimize the possibility of a misidentification occurring. Should the car speed be excessive, as determined at 76, then the engineer is notified at 80 by use of a citizens' band radio, or other like communication medium, to advise of the excessive speed and the need to slow the train. The identity of the car is then determined at 78. The citizens' band radio may broadcast through the antenna 40, and may be part of the controller 38. We prefer use of an electromagnetic energy system, such as a citizens' band radio, because most railroad trains already have that capability.

The question is asked at 82 whether the upstream through-beam scanner is continuing to detect the car 16. If yes, then the controller 36 continues to scan at 84. If the upstream through-beam scanner does not detect the car at 82, then at 86 the controller 36 begins to prepare for the next car. An inquiry is made at 88 whether the downstream through-beam scanner is detecting the car 16. If a car is being detected at 88, then the controller 36 causes the detectors D to continue to scan for radiation. Should the trailing through-beam scanner not detect a car at 88, then the controller 36 begins to prepare for the next car at 90.

Once the scan is completed as determined at 88 when no car is detected, then the controller 36 determines at 92 whether radioactive contamination has been detected by the detectors D. Should radioactive contamination be detected at 92, then the data for the ticket 48 is downloaded at 94 to a print buffer. The print buffer permits the ticket 48 to be printed at 96 on a non-realtime basis, while the controller 36 is available to continue to operate the detectors D for subsequent railroad cars 16. Should a print buffer not be provided, then the controller 36 may not be able to receive from the detectors D the data about the second or other subsequent cars 16 because of a need to print record 48. In that event, those other cars would not be scanned or not scanned completely, or there would be no data to determine whether there was contamination. Once it is determined at 92 that radioactive contamination has been detected, then indicators are actuated at 98 to identify the car and to make known to the engineer the potential contamination. The actual detection of contamination will typically be made by inspection of the car 16, so that the profile 64 will be helpful in identifying the contaminated site. Actuation of the indicators at 98 causes the identification of the car 16 of interest to be frozen on the scoreboard 42, so that anyone thereafter viewing the housing H will be able to ascertain which car 16 contains the contamination. The scoreboard 42 will otherwise scroll through the cars 16 as they proceed beyond the detectors D, identifying each car in sequence. Once the indicators are actuated at 98, however, then subsequent cars 16 are not displayed on the scoreboard 42.

Also, actuation of the indicators at 98 causes the citizens' band radio to notify the engineer that a contaminated car has been detected. The engineer may then complete pulling all cars through the scan zone SZ between the detectors D, and then stop the train to permit the particular car to be removed for subsequent investigation. The citizens' band radio notification is advantageous because the train may be too long for the scoreboard 42 to be viewed, or it may not be viewable. Thus, the audible alarm notification to the engineer is provided to notify that radiation has been detected, so that appropriate action may be taken.

Because the identification of the car is displayed on the scoreboard 42, then it is a relatively simple matter to separate the particular car while permitting the train to continue with the rest of the scrap.

Because of the citizens' band radio notification to the engineer, the freezing of the scoreboard 42, and the automatic actuation of the detectors D through the use of the through-beam scanners, then there is no need for an attendant at the housing H as the train passes along the roadway R.

While this invention has been described as having a preferred design, it is understood that it is capable of further modifications, uses, and/or adaptations thereof, following in general the principles of the invention and including such departures that have been known or customary practice in the art to which the invention pertains.

What we claim is:

1. A system for detecting radioactive contamination of scrap in a vehicle, comprising:

a first detector positioned proximate a roadway for detecting the presence of a moving vehicle;

at least first and second laterally spaced scintillators downstream of said first detector, said scintillators being disposed on opposite sides of the roadway for therebetween defining a scan zone;

a second detector positioned proximate the roadway downstream of said scintillators for detecting the presence of the moving vehicle;

a vehicle identifier proximate one of said scintillators for identifying the vehicle detected by said detector;

a controller operably associated with at least said first detector, said scintillators, and said identifier for activating said scintillators upon said first detector detecting a vehicle, for determining whether the vehicle contains radioactive contamination upon completion of a scan made by the scintillators, and for activating an indicator system should radioactive contamination be detected; and a visual indicator operably associated with said controller for identifying the vehicle having the contamination and an audible indicator operably associated with said controller for indicating the detection of contamination.

2. The system of claim 1, wherein:

said visual indicator is a fixed position indicator; and said audible indicator is movable with a transport vehicle.

3. The system of claim 2, wherein:

said audible indicator includes an electromagnetic energy source; and said indicator system includes an electromagnetic energy generator operably associated with said controller.

4. The system of claim 1, wherein:

said vehicle identifier includes a first component fixed proximate one of said scintillators and a second component carded by the vehicle.

5. The system of claim 4, wherein:

said first component includes means for interrogating said second component for identifying the vehicle.

6. The system of claim 4, wherein:

said first component is a tag affixed to the vehicle, and said second component is a radio frequency identification transceiver.

7. The system of claim 1, further comprising:

a printer operably associated with said controller for printing a permanent record of the scan made by the scintillators.

8. The system of claim 1, wherein:

each of said scintillators scans for gamma radiation.

9. A method for automatically monitoring for radioactive contamination in transport vehicles, comprising the steps of:

automatically detecting the presence of a moving transport vehicle;

commencing to scan the vehicle for radiation after the vehicle has been detected and continuing to scan for radioactive contamination;

automatically determining the identity of a vehicle;

ceasing to scan for radioactive contamination after the vehicle is no longer detected;

automatically determining whether the scanned vehicle contains radioactive contamination, and automatically indicating the detection of radioactive contamination in that event; implementing the step of detecting the presence of the vehicle with first and second spaced photoelectric sensors, and determining the speed of the vehicle after it has been detected by the sensors; and determining whether the vehicle speed exceeds a preselected speed.

10. The method of claim 9, including the step of:

providing a through-beam sensor as each of the photoelectric sensors.

11. The method of claim 9, including the step of:

continuing to scan the vehicle while the vehicle is detected by the second sensor.

12. A method of automatically detecting radiation contamination in scrap steel, comprising the steps of:

providing a moving railroad car in which scrap material is contained;

automatically commencing to scan the scrap material for radiation contamination by moving the railroad car beyond a radiation scanned;

automatically determining the identity of the railroad car while it is being scanned;

ceasing to scan for radiation contamination after the railroad car has moved beyond the radiation scanner;

automatically determining whether the railroad car contains scrap material contaminated by radiation, and automatically identifying the railroad car containing the contaminated scrap material in that event;

providing at least a first scintillator as the radiation scanner;

detecting the presence of the railroad car prior to commencing to scan for radiation contamination;

implementing the step of detecting the presence of a railroad car with a through-beam optical detector comprising first and second spaced optical detectors;

calculating the speed of the railroad car while the railroad car is moving between the detectors; and automatically actuating an indicator when the railroad car exceeds a predetermined speed.

* * * * *